Aug. 12, 1924.  
E. SANDUSKY  
ADVERTISING DEVICE  
Filed June 26, 1923

1,504,907

WITNESSES  
Edw. Thorpe

INVENTOR  
E. SANDUSKY  
BY  
ATTORNEYS

Patented Aug. 12, 1924.

1,504,907

UNITED STATES PATENT OFFICE.

EARL SANDUSKY, OF LOS ANGELES, CALIFORNIA, ASSIGNOR TO THE BAILEY FITWELL COMPANY, INC., OF LOS ANGELES, CALIFORNIA, A CORPORATION OF CALIFORNIA.

ADVERTISING DEVICE.

Application filed June 26, 1923. Serial No. 647,856.

*To all whom it may concern:*

Be it known that I, EARL SANDUSKY, a citizen of the United States, and a resident of Los Angeles, county of Los Angeles, and State of California, have invented new and Improved Advertising Devices, of which the following is a full, clear, and exact description.

The present invention relates to new and useful improvements in advertising devices.

It is one of the objects of the invention to provide a new and novel advertising device adapted for attachment to the spare tire of a vehicle, such, for example, as an automobile or the like.

It is a further object of the invention to provide a device of this character which may be readily attached to and detached from the spare tire.

It is a further object of the invention to construct a device of this character in such a manner that it may be used in connection with a tire cover or a tire not employing a cover.

It is a still further object of the invention to construct the device in such a manner that the same is not permanently secured to a tire.

With the above and other objects in view, reference is had to the accompanying drawings, in which—

Figure 1:
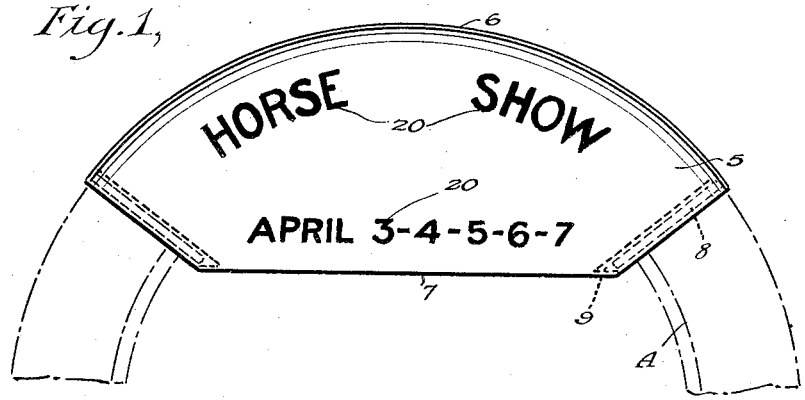
Figure 1 is a view in elevation of a device constructed in accordance with the present invention, showing its relation to a spare tire, the tire being shown in dotted lines.
Figure 2:
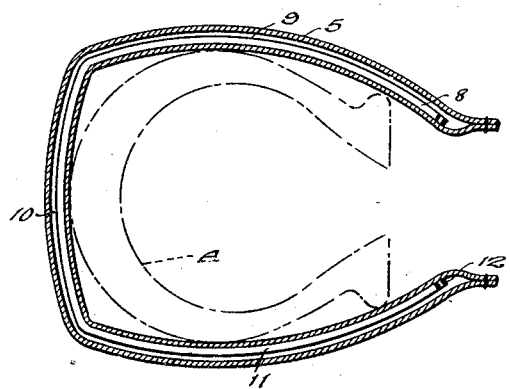
Fig. 2 is a detail transverse sectional view.

Referring more specifically to the drawings, the dotted line in Fig. 1, designated by the reference character A, indicates a tire, which tire is adapted to be carried by a vehicle in any desired manner. The reference character 5 designates a body portion, which is preferably double and is adapted to embrace a tire as shown. The upper or outer edge 6 of the body portion is curved to conform to the periphery of the tire while the inner edge 7 is shorter than the outer edge 6 and is substantially straight.

Figure 3:
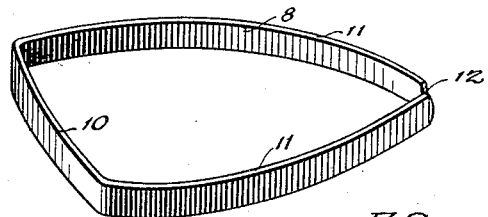
Fig. 3 is a perspective view of one of the elements in detached relation.

Mounted in each end of the body portion is a resilient substantially U-shaped member 8, and each of the U-shaped members 8 is mounted in a pocket 9 formed in the end of the body portion. One of these U-shaped members 8 is shown in perspective in Fig. 3, and the same comprises a base portion 10, from which project curved legs 11, the ends of which are brought into proximity with each other as at 12.

By the above outlined construction it is apparent that as the legs 11 of the U-shaped member 8 are spread they may be passed around a tire, and that when they are released owing to their resiliency they will spring inwardly into gripping relation with the tire to cause the body portion 5 to assume a smooth and unruffled position upon the tire.

The outer or exposed face of the body portion is provided with suitable indicia designated by the numeral 20, and it will be noted that when this body portion is positioned outwardly the indicia carried thereby is displayed.

From the foregoing it is apparent that the present invention provides a new and novel form of advertising device which may be attached to the spare tire carried by a motor vehicle, and, furthermore, the invention provides a device of this character which is capable of attachment to the tire without in any way modifying the tire or its support or carrier.

What is claimed is:

A device of the character described comprising a substantially U-shaped body member provided with a pocket at each end thereof, and a U-shaped resilient member mounted in each of said pockets and serving as means for securing the device in display position.

EARL SANDUSKY.